United States Patent
Humfeld et al.

(10) Patent No.: US 11,110,631 B2
(45) Date of Patent: Sep. 7, 2021

(54) SYSTEMS, CURE TOOLS, AND METHODS FOR THERMALLY CURING A COMPOSITE PART

(71) Applicant: The Boeing Company, Chicago, IL (US)

(72) Inventors: Keith D. Humfeld, Chicago, IL (US); Joseph A. Bolton, Chicago, IL (US)

(73) Assignee: The Boeing Company, Chicago, IL (US)

( * ) Notice: Subject to any disclaimer, the term of this patent is extended or adjusted under 35 U.S.C. 154(b) by 9 days.

(21) Appl. No.: 16/459,819

(22) Filed: Jul. 2, 2019

(65) Prior Publication Data

US 2021/0001518 A1   Jan. 7, 2021

(51) Int. Cl.
*B29C 35/00* (2006.01)
*B29C 70/28* (2006.01)
*B29C 35/02* (2006.01)

(52) U.S. Cl.
CPC .......... *B29C 35/002* (2013.01); *B29C 35/007* (2013.01); *B29C 35/0288* (2013.01); *B29C 70/28* (2013.01)

(58) Field of Classification Search
CPC ....... B29C 35/007; B29C 33/06; B29C 35/08; B29C 70/44; B29C 2035/046
USPC ........................................................ 156/242
See application file for complete search history.

(56) References Cited

U.S. PATENT DOCUMENTS

| | | | |
|---|---|---|---|
| 3,425,642 A | 2/1969 | May | |
| 3,618,350 A | 11/1971 | Larrimer et al. | |
| 4,431,397 A * | 2/1984 | Fried | B29C 33/34 425/384 |
| 4,462,787 A | 7/1984 | Bogardus, Jr. et al. | |
| 4,969,972 A | 11/1990 | Kunz | |
| 5,826,320 A | 10/1998 | Rathke et al. | |
| 7,357,166 B2 | 4/2008 | Pham et al. | |
| 8,293,051 B2 | 10/2012 | Morris et al. | |
| 8,430,984 B2 | 4/2013 | Lee et al. | |
| 8,545,201 B2 * | 10/2013 | Vander Wei | B29C 43/36 425/3 |

(Continued)

OTHER PUBLICATIONS

Ganji. Nonlinear Systems in Heat Transfer, Mathematical Modeling and Analytical Methods. (2018) pp. 105-151 (Year: 2018).*

(Continued)

*Primary Examiner* — Matthew J Daniels
*Assistant Examiner* — Hana C Page
(74) *Attorney, Agent, or Firm* — McDonnell Boehnen Hulbert & Berghoff LLP

(57) ABSTRACT

An example method for curing a composite part includes placing the composite part onto a topside of a cure tool, and a bottom surface of the composite part contacts the topside of the cure tool and a top surface of the composite part is opposite the bottom surface of the composite part. The method also includes placing the cure tool and the composite part into an autoclave, using the autoclave to apply external heat to the cure tool and the composite part so that air flows over the top surface of the composite part to heat the top surface, and applying additional heat to a backside of the cure tool via radiation provided by at least one heating source of the cure tool, so as to reduce a temperature difference between the backside of the cure tool and the top surface of the composite part being cured.

20 Claims, 4 Drawing Sheets

(56) References Cited

U.S. PATENT DOCUMENTS

| | | | |
|---|---|---|---|
| 8,800,953 B2 | 8/2014 | Morris et al. | |
| 8,974,217 B2 | 3/2015 | Everhart et al. | |
| 9,277,594 B2 | 3/2016 | Matsen et al. | |
| 9,827,720 B2 | 11/2017 | Heath et al. | |
| 10,272,596 B2 | 4/2019 | Register | |
| 2002/0162940 A1* | 11/2002 | Frul | B29C 33/04 |
| | | | 249/79 |
| 2005/0211870 A1 | 9/2005 | Browne et al. | |
| 2012/0305197 A1 | 12/2012 | Vander Wei et al. | |
| 2014/0354381 A1 | 12/2014 | Kohlhafer | |
| 2016/0297109 A1* | 10/2016 | Trudeau | B29C 35/0288 |
| 2017/0095984 A1* | 4/2017 | Anderson | B29C 35/0288 |
| 2017/0133139 A1 | 5/2017 | Hegenbart et al. | |
| 2017/0232641 A1* | 8/2017 | Humfeld | B29C 33/3828 |
| | | | 264/40.1 |

OTHER PUBLICATIONS

Lagorce, et al. "Magnetic Microactuators Based on Polymer Magnets", Journal of Microelectromechanical Systems, vol. 8, No. 1, pp. 1-9, Mar. 1999.

* cited by examiner

APPLYING WATER THROUGH THE ADJACENT CLOSABLE CELL CAVITIES TO ENABLE RAPID COOLING OF THE COMPOSITE PART —214

FIG. 8

APPLYING AIR THROUGH THE ADJACENT CLOSABLE CELL CAVITIES TO REMOVE THE WATER FROM THE ADJACENT CELL CAVITIES —216

FIG. 9

MAINTAINING THE CLOSABLE CELL CAVITIES UNDER VACUUM PRESSURE VIA A VACUUM MANIFOLD DURING PORTIONS OF CURING OF THE COMPOSITE PART —218

FIG. 10

SYSTEMS, CURE TOOLS, AND METHODS FOR THERMALLY CURING A COMPOSITE PART

FIELD

The present disclosure generally relates to systems, cure tools, and methods for thermally curing a composite part, and more particularly to, applying additional heat to a cure tool via radiation so as to reduce a temperature variation between a backside of the cure tool and a top surface of a composite part being cured.

BACKGROUND

Composite parts, such as those used in the manufacture of aircraft, can be constructed using various production methods, such as filament winding, tape placement, overbraid, chop fiber roving, coating, hand lay-up, or other composite processing techniques and curing processes. Most of these processes use a rigid cure tool/mandrel on which composite material is applied and then cured into a rigid composite part. For example, automated fiber placement (AFP) machines may be used to place fiber reinforcements on molds or mandrels to form composite layups. Following, composite parts may be cured within an autoclave that applies heat and pressure to the part during a cure cycle.

The autoclave includes a heat source, such as resistive heating elements, to supply heat to air via confection and to the parts through convection. Full curing requires that all areas of the parts are heated to necessary cure temperatures for a prescribed period of time. Where parts and tools have areas of different masses or thermal insulation characteristics, typical of larger, more complex parts, extended cycle times may be required to carry out full curing because the part areas having a higher mass or thermal insulation characteristic are slower to heat up to the required cure temperature. These extended cure cycle times reduce production throughput and may result in a need for additional autoclaves to meet higher production schedules.

Accordingly, there is a need for a method and apparatus which reduces cure cycle times by providing a more efficient curing of the composite parts. There is also a need for a method and apparatus of the type mentioned above that may be used in combination with existing curing equipment and that provides selective, precisely controlled thermal augmentation for carrying out enhanced, optimized curing of composite parts.

SUMMARY

In one example, a method for curing a composite part is described. The method comprises placing the composite part onto a topside of a cure tool and a bottom surface of the composite part contacts the topside of the cure tool and a top surface of the composite part is opposite the bottom surface of the composite part, placing the cure tool and the composite part into an autoclave, using the autoclave to apply external heat to the cure tool and the composite part such that air flows over the top surface of the composite part to heat the top surface of the composite part, and applying additional heat to a backside of the cure tool via radiation provided by at least one heating source of the cure tool, so as to reduce a temperature difference between the backside of the cure tool and the top surface of the composite part being cured and the backside of the cure tool is opposite the topside of the cure tool.

In another example, a cure tool for thermally curing a composite part is described. The cure tool comprises a topside of a cure tool onto which a composite part is placed and a bottom surface of the composite part contacts the topside of the cure tool once placed and a top surface of the composite part is opposite the bottom surface of the composite part, a backside of the cure tool opposite the topside of the cure tool, adjacent closeable cell cavities on the backside of the cure tool, and a plurality of radiative heating sources positioned in each of the closeable cell cavities and the plurality of radiative heating sources are configured to apply heat to the backside of the cure tool via radiation.

In another example, a system for thermally curing a composite part is described. The system comprises a cure tool comprising a topside of the cure tool onto which a composite part is placed and a bottom surface of the composite part contacts the topside of the cure tool once placed and a top surface of the composite part is opposite the bottom surface of the composite part, a backside of the cure tool opposite the topside of the cure tool, adjacent closeable cell cavities on the backside of the cure tool, and a plurality of radiative heating sources positioned in each of the closeable cell cavities and the plurality of radiative heating sources are configured to apply heat to the backside of the cure tool via radiation. The system also comprises an autoclave adapted to have the cure tool and the composite part placed therein, the autoclave including a heating element adapted to provide heat to the cure tool and composite part, wherein air flows over the top surface of the composite part to heat the top surface of the composite part.

The features, functions, and advantages that have been discussed can be achieved independently in various embodiments or may be combined in yet other embodiments further details of which can be seen with reference to the following description and drawings.

BRIEF DESCRIPTION OF THE FIGURES

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying drawings, wherein:

FIG. 8 shows another method for use with the method shown in FIG. 5, according to an example implementation.

FIG. 9 shows another method for use with the method shown in FIGS. 5 and 8, according to an example implementation.

FIG. 10 shows another method for use with the method shown in FIG. 5, according to an example implementation.

DETAILED DESCRIPTION

Disclosed embodiments will now be described more fully hereinafter with reference to the accompanying drawings, in which some, but not all of the disclosed embodiments are shown. Indeed, several different embodiments may be described and should not be construed as limited to the embodiments set forth herein. Rather, these embodiments are described so that this disclosure will be thorough and complete and will fully convey the scope of the disclosure to those skilled in the art.

Within examples, methods, systems, and cure tools for reduces a temperature difference or variation between a bottom of the cure tool to a top of a composite part being cured are described. The cure tools can thus reduce a time difference between when a leading part thermocouple reaches 345° F. (for cure of the composite part) and when a lagging part thermocouple reaches 345° F., which decreases a duration or time of a cure cycle. Given that curing the composite part in the autoclave is a bottleneck in composite manufacturing facility, this improves not only a rate of individual part production, but also increases manufacturing capacity of a composites factory.

In existing manufacturing facilities, there will be a time lag between the leading thermocouple and the lagging thermocouple reaching cure temperatures due to a level of control over air flow within an autoclave. Using examples described herein, a diffuse heating method is provided to heat the backside of the cure tool without forming hotspots caused by resistive heating. For example, heat is applied to the back side of the cure tool by radiation rather than by convection from the autoclave air or conduction from resistive heaters. The additional heat is complementary to autoclave air heating of the top side of the cure tool and composite part. Further structural components are provided to prevent conduction of heat into the tooling substructure which is a heat sink that typically causes cool spots on the composite part. Moreover, zoned control of heating is enabled through use of the multiple radiative heating sources described herein. Furthermore, the methods, systems, and cure tools enable improved methods of cooling the cure tool and composite part.

Figure 1:
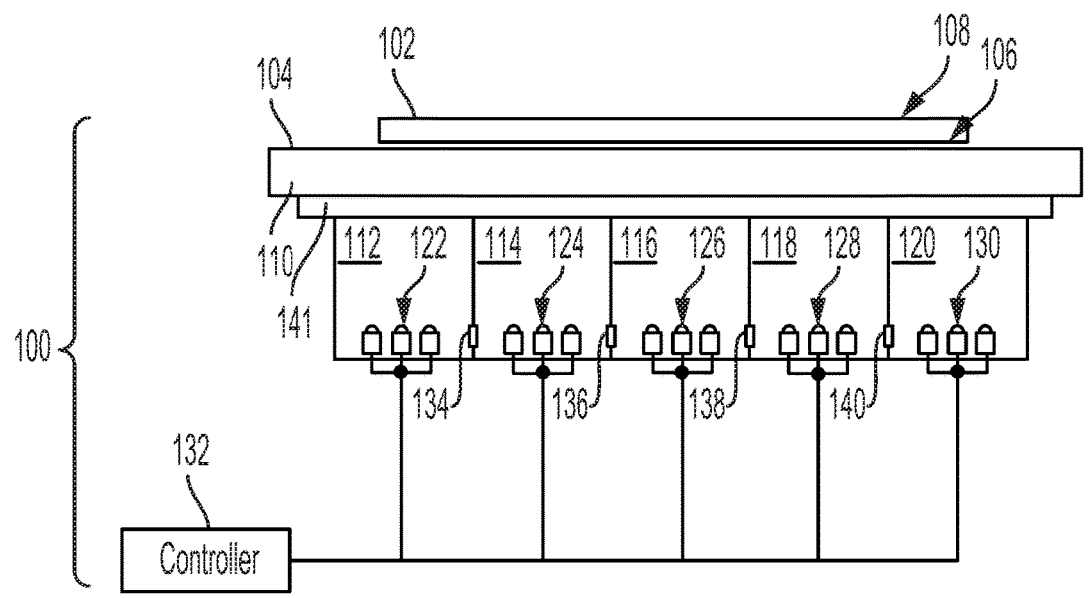
FIG. 1 illustrates an example of a cure tool for thermally curing a composite part, according to an example implementation.

Referring to FIG. 1, a cure tool 100 for thermally curing a composite part 102 is illustrated, according to an example implementation. The cure tool 100 includes a topside 104 of the cure tool 100 onto which the composite part 102 is placed, and a bottom surface 106 of the composite part 102 contacts the topside 104 of the cure tool 100 once placed and a top surface 108 of the composite part 102 is opposite the bottom surface 106 of the composite part 102. The cure tool 100 includes a backside 110 of the cure tool 100 opposite the topside 104 of the cure tool 100, adjacent closeable cell cavities 112, 114, 116, 118, and 120 (112-120) on the backside 110 of the cure tool 100, and a plurality of radiative heating sources 122, 124, 126, 128, and 130 (122-130) positioned in each of the closeable cell cavities 112-120. The plurality of radiative heating sources 122-130 are configured to apply heat to the backside 110 of the cure tool 100 via radiation.

The composite part 102 may comprise multiple plies (not shown) of fiber reinforced polymer resin, according to an example embodiment. For example, multiple plies of fiber reinforced polymer plies can be laid up over the cure tool 100 in order to form the plies into a desired part shape. The composite part 102 may be cured to form any of a variety of composite components, structures, or parts that form full or partial enclosures having uniform or non-uniform cross sections along their lengths. For example, the cured part may comprise a duct (not shown) or a conduit (not shown) used to transport fluids, such as, for example and without limitation, air ducts and fuel lines used in a wide variety of applications, including vehicles.

Example composite material used for the composite part 102 may be generally a lightweight material, such as an uncured pre-impregnated reinforcing tape or fabric (i.e., "prepreg"). The tape or fabric can include a plurality of fibers such as graphite fibers that are embedded within a matrix material, such as a polymer, e.g., an epoxy or phenolic. The tape or fabric could be unidirectional or woven depending on a degree of reinforcement desired. Thus, the prepreg tape or fabric is laid onto the cure tool 100 (or mold) to pre-form the tape or fabric into a desired shape of the composite part 102. The composite part 102 could be any suitable dimension to provide various degrees of reinforcement, and could comprise any number of plies of prepreg tape or fabric.

As described, the cure tool 100 includes the topside 104 of the cure tool 100 onto which the composite part 102 is placed and the backside 110 opposite the topside 104. The topside 104 of the cure tool 100 and the backside 110 of the cure tool 100 comprise a solid sheet, in some examples, and the adjacent closeable cell cavities 112-120 are formed on the backside 110 of the cure tool 100.

The adjacent closeable cell cavities 112, 114, 116, 118, and 120 (112-120) on the backside 110 of the cure tool 100 can be closed cavities or closed cells that contain air or may be maintained under vacuum. Thus, the closeable cell cavities 112-120 may be made with sheets formed into a rectangular grid and each cell has a bottom side to form cells on an underside of the cure tool 100 that are closed cells.

The adjacent closeable cell cavities 112, 114, 116, 118, and 120 (112-120) on the backside 110 of the cure tool 100 prevent transfer of heat by convection due to blocking airflow on the backside 110. For example, convective heat transfer may be reduced or eliminated because air pressure inside each of the closeable cell cavities 112-120 is low which reduces the rate at which energy is transferred to or from the backside 110 of the cure tool 100 for a given difference in temperature between the air and the backside 110 surface. Rather, the plurality of radiative heating sources 122, 124, 126, 128, and 130 (122-130) positioned in each of the closeable cell cavities 112-120 apply heat in a focused manner to the backside 110 of the cure tool 100.

The plurality of radiative heating sources 122-130 may be or include infrared (IR) heaters (e.g., diodes). In other examples, the plurality of radiative heating sources 122-130 includes microwave or X-ray sources. The plurality of radiative heating sources 122-130 can have angular distribution and may be mounted to radiate upward toward the backside 110. Although three heating sources are shown in each of the closeable cell cavities 112-120, more or fewer heating sources may be included. In some examples, an array of radiative heating sources can be included to provide redundancy such that if one heating source malfunctions, more power can be provided to the remaining heating sources to achieve similar heating capabilities.

The plurality of radiative heating sources 122-130 are controlled to maintain the backside 110 at approximately the same temperature as the proximate topside 104. The plurality of radiative heating sources 122-130 may be used out of an autoclave (prior to cure of the composite part 102) to preheat the cure tool 100 and the composite part 102 prior to going into the autoclave.

The plurality of radiative heating sources 122-130 provide a diffuse heat to the backside 110 of the cure tool 100. This is similar to autoclave air but the heat is controllable and can be applied at rates that are higher than typically possible using convective air heating of the tooling substructure. The plurality of radiative heating sources 122-130 are advantageous for use as compared to resistive heating, which can result in hot spots due to reliance on conduction to spread the heat laterally.

The cure tool 100 further includes or is communicatively coupled (via hardwire or wireless communication) to a controller 132. The controller 132 includes one or more processors, data storage, and instructions stored on the data storage that are executable by the one or more processors to perform functions including controlling operation of the plurality of radiative heating sources 122-130. The plurality of radiative heating sources 122-130 are thus independently controllable, so that selection of one or more of the plurality of radiative heating sources 122-130 can be made based on a location of the plurality of radiative heating sources 122-130 on the backside 110 of the cure tool 100 so as to apply the additional heat using the one or more of the plurality of radiative heating sources 122-130 for zoned control heating. As one example, in one cell, perhaps five out of fifteen heating sources are powered and in another cell there could be fifteen of the heating sources powered to achieve a different heating pattern.

The closeable cell cavities 112-120 further include ports 134, 136, 138, and 140 connecting each respective closeable cell cavity to a respective adjacent closeable cell cavity, so that each adjacent closeable cell cavity is open to each other. The ports 134-140 may be used for maintaining the closeable cell cavities 112-120 under vacuum pressure during cure of the composite part 102, for example, and described more fully below. In other examples, the closeable cell cavities may be entirely sealed under vacuum such that the closeable cell cavities 112-120 contain a vacuum at all times.

The cure tool 100 also includes a layer of insulating material 141 positioned between walls of the closeable cell cavities 112-120 and the backside 110 of the cure tool 100. For example, the insulating material 141 may include metal foam that is incorporated to reduce the conduction of heat. The insulating material 141 may alternatively be an insert that is bolted to the backside 110 for structure and uses vacuum grease or O-rings for a seal. The sidewalls of the closable cell cavities and the tooling substructure can thus be protected from heat absorption via conduction by the inclusion of the insulating material 141, and convection can be reduced or eliminated by application of vacuum to the closeable cell cavities 112-120.

Figure 2:
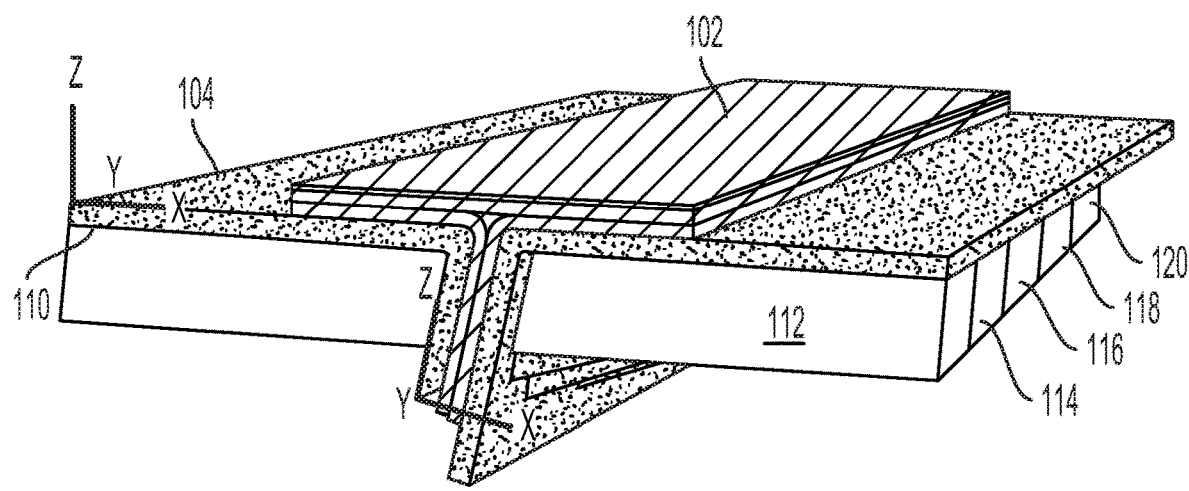
FIG. 2 illustrates another example of a portion of the cure tool, according to an example implementation.

FIG. 2 illustrates another example of a portion of the cure tool 100, according to an example implementation. In this example, the composite part 102 is laid up on the topside 104 and the closeable cell cavities 112-120 are shown on the backside 110. The cure tool 100 is shown divided into two parts in this example, in which a portion of the composite part 102 is positioned between the two parts. The composite part 102 may be, for example, a short section of a stringer. The cure tool may comprise multiple tools positioned side to side.

Figure 3:
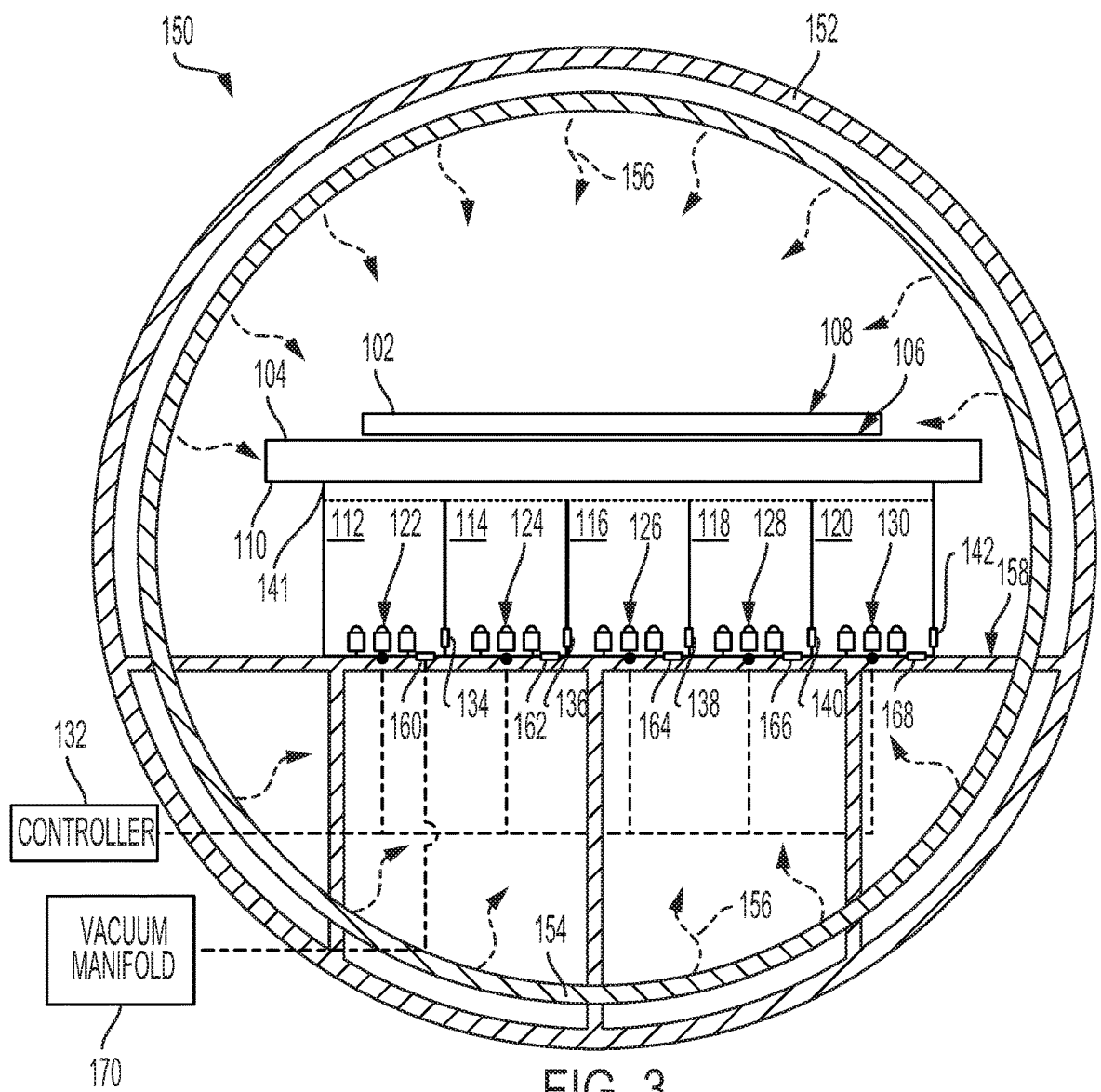
FIG. 3 is an example of a system for thermally curing the composite part 102, according to an example implementation.

FIG. 3 is an example of a system 150 for thermally curing the composite part 102, according to an example implementation. The system 150 includes the cure tool 100 with the topside 104 of the cure tool 100 onto which the composite part 102 is placed, and a bottom surface 106 of the composite part 102 contacts the topside 104 of the cure tool 100 once placed and the top surface 108 of the composite part 102 is opposite the bottom surface 106 of the composite part 102. The cure tool 100 includes the backside 110 of the cure tool 100 opposite the topside 104 of the cure tool 100, adjacent closeable cell cavities 112-120 on the backside 110 of the cure tool 100, and the plurality of radiative heating sources 122-130 positioned in each of the closeable cell cavities 112-120, respectively, and the plurality of radiative heating sources 122-130 are configured to apply heat to the backside 110 of the cure tool 100 via radiation. The system 150 also includes an autoclave 152 adapted to have the cure tool 100 and the composite part 102 placed therein, and the autoclave 152 includes a heating element 154 adapted to provide heat 156 to the composite part.

The composite part 102 is positioned on the cure tool 100 for curing in the autoclave 152. The assembly of the composite part 102 and the cure tool 100 are supported on a cure rack 158 inside the autoclave 152. The composite part 102 is cured by subjecting the composite part 102 to a combination of heat and pressure within the autoclave 152, according to a predetermined cure schedule specifying applied pressures, temperatures, and durations for which the pressures and temperatures are maintained. Heating of the composite part 102 is effected within the autoclave 152 using the heating element 154, which may include a circumferentially extending electrical resistive heating element to heat the composite part 102 using a combination of conduction, convection and radiation.

In FIG. 3, each of the closeable cell cavities 112-120 include a first port (such as ports 132, 134, 136, 138, 140, 142) and a second port 160, 162, 164, 166, 168 (160-168). The first port 134-142 and the second port 160-168 are configured for coupling one or more of (i) a vacuum outlet, (ii) a water inlet, and (iii) an air inlet. The first port 134-142 are shown on a side wall of the closeable cell cavities 112-120 and the second port 160-168 are shown on a bottom wall of the closeable cell cavities 112-120; however, any of the ports may be located on any wall of the closeable cell cavities 112-120.

The system 150 further includes a vacuum manifold 170 coupled to an input port (such as the second port 160 of closeable cell cavity 112) for maintaining the closeable cell cavities 112-120 under vacuum pressure during cure of the composite part 102. The vacuum pressure can be maintained within all of the closeable cell cavities 112-120 via the interconnection of the closeable cell cavities 112-120 through ports 134-140, for example.

Figure 4:
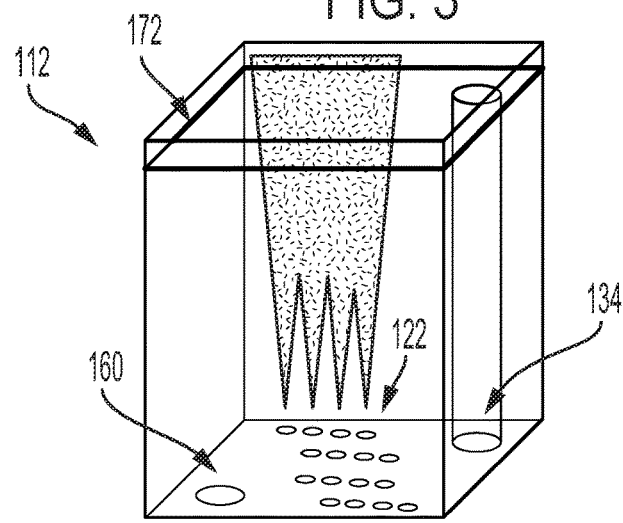
FIG. 4 illustrates an example of one of the closeable cell cavities, according to an example implementation.

FIG. 4 illustrates an example of one of the closeable cell cavities 112, according to an example implementation. The closeable cell cavity 112 is shown to include sixteen radiative heating sources 122 positioned in an array to provide a light cone in a focused manner. Each of the ports 134 and 160 are shown on a bottom wall of the closeable cell cavity 112, and the port 160 may be provided for a vacuum outlet whereas the port 134 may be provided for a water/air inlet. The water/air inlet may be optionally plumbed internally to approximately a top of the closeable cell cavity 112 so that water/air entering the closeable cell cavity 112 will contact the tool backside surface (top surface of the cell), for example.

In FIG. 4, the closeable cell cavity 112 also includes insulator supports 172 surrounding a top of the closeable cell cavity 112, but leaving the backside 110 of the cure tool 100 open to the closeable cell cavity 112 for the IR heat source (e.g., radiative heating source 122) to provide heat out of the closeable cell cavity 112. The insulator supports 172 are configured to hold the insulating material 141 (shown in FIGS. 1 and 3), for example.

In operation and during cure of the composite part 102, airflow in an upper section of the autoclave 152 (e.g., above the composite part 102 and above the topside 104 of the cure tool 100) is faster than airflow in a lower section of the autoclave 152 (e.g., through a substructure of the cure tool 100 and on the backside 110). Thus, a temperature of the top surface 108 of the composite part 102 closely matches the air temperature due to the good convection and high-speed of the flow of the air in the autoclave 152 within the upper section, but a sub-structure of the cure tool 100 on the backside blocks air flow. Also, due to the cure tool 100 having significantly higher thermal masses than the composite part 102, and that the transfer of heat from the air to the composite part 102 is approximately linearly dependent on speed of the air, the backside 110 of the cure tool 100 can be under heated, which in turn, determines a length of the cure cycle.

It has been determined that the duration of the cure cycle of certain composite parts can be reduced from nine hours to six and a half hours if the temperature of the underside of the cure tool 100 could be maintained at approximately the same as the temperature as the top surface 108 of the composite part 102. Thus, within examples described herein, the plurality of radiative heating sources 122-130 can be used to augment heating of the backside 110 of the cure tool 100 in order to reduce the cure duration. A modification to the tool substructure through use of the closeable cell cavities 112-120 rather than having large open cells enables placement of the plurality of radiative heating sources 122-130.

Within examples, for curing of the composite part, the cure tool 100 and the composite part 102 are placed into the autoclave 152, which is used to apply external heat to the cure tool 100 and the composite part 102. Air flows over the top surface 108 of the composite part 102 to heat the top surface 108 of the composite part 102. Subsequently or simultaneously, additional heat is applied to the backside 110 of the cure tool 100 via radiation provided by at least one heating source of the cure tool 100 (e.g., the plurality of heating sources 122-130), so as to reduce a temperature difference between the backside 110 of the cure tool 100 and the top surface 108 of the composite part 102 being cured.

In some examples, temperature sensors (not shown) may be included in an upper section of the autoclave 152, and the sensors may output temperature readings to the controller 132. The controller 132 can then operate the plurality of radiative heating sources 122-130 accordingly to both heat the backside 110 of the cure tool 100 to a desired temperature as well as provide zoned control heating of portions of the backside 110 at different temperatures as may be needed to reduce a temperature difference between the backside 110 of the cure tool 100 and the top surface 108 of the composite part 102 being cured.

In some examples, a thermal profile of each specific composite part to be cured can be determined by curing the composite part 102 on the cure tool 100 in the autoclave 152 and including temperature sensors or thermocouples on the composite part 102 to determine locations on the composite part 102 that are leading/lagging in terms of temperature increase as well as to determine a temperature distribution per part. The thermal profile can be used by the controller 132 to control operation of the plurality of radiative heating sources 122-130 for zoned control heating.

As additional features of the system 150, the composite part 102 and cure tool 100 can be removed from the autoclave 152 while still at elevated temperatures and then allowed to cool by ambient air being passed through the closeable cell cavities 112-120 to ensure good airflow across the backside 110 of the cure tool 100. In addition, since the composite part 102 can be removed from the autoclave 152 while still at elevated temperatures, the autoclave 152 is then free to use for curing of more parts. As one example, the composite part and the cure tool can be removed from the autoclave 152 while the composite part 102 is at a temperature above 140° F. Within some existing methods today, parts are removed from the autoclave 152 once the hottest location has dropped to below 140° F. for human handleability. However, using methods described herein, the cure tool 100 and the composite part 102 can be removed from the autoclave 152 while an internal region of the cure tool 100 that is not physically accessible is still at an elevated temperature above 140° F. due to the lack of a safety risk because the heat cannot escape from the backside 110 of the cure tool 100.

To further facilitating cooling of the composite part 102, the closeable cell cavities 112-120 can alternatively be filled with water to enable a more rapid cooling. Thus, water can be provided through the ports 134-142 that otherwise had vacuum to rapidly decrease temperatures. The water can then be vacuumed out of the closeable cell cavities 112-120 too. Further, in the instance that some water remains in the closeable cell cavities 112-120, during a subsequent cure cycle in the autoclave 152, the water will be heated and will evaporate.

Thus, the composite part 102 can be removed from the autoclave 152 and cooled by applying room temperature air through the adjacent closeable cell cavities 112-120 to enable rapid air cooling of the composite part 102, and/or by applying water through the adjacent closeable cell cavities 112-120 to enable rapid cooling of the composite part 102.

Another consideration is that for rapid composites processing, rapid manufacturing of composites does not allow for time for the cure tool 100 to be cooled to room temperature while in the autoclave 152. Thus, using methods described herein can further enable rapid manufacturing of composite parts to be performed.

Figure 5:
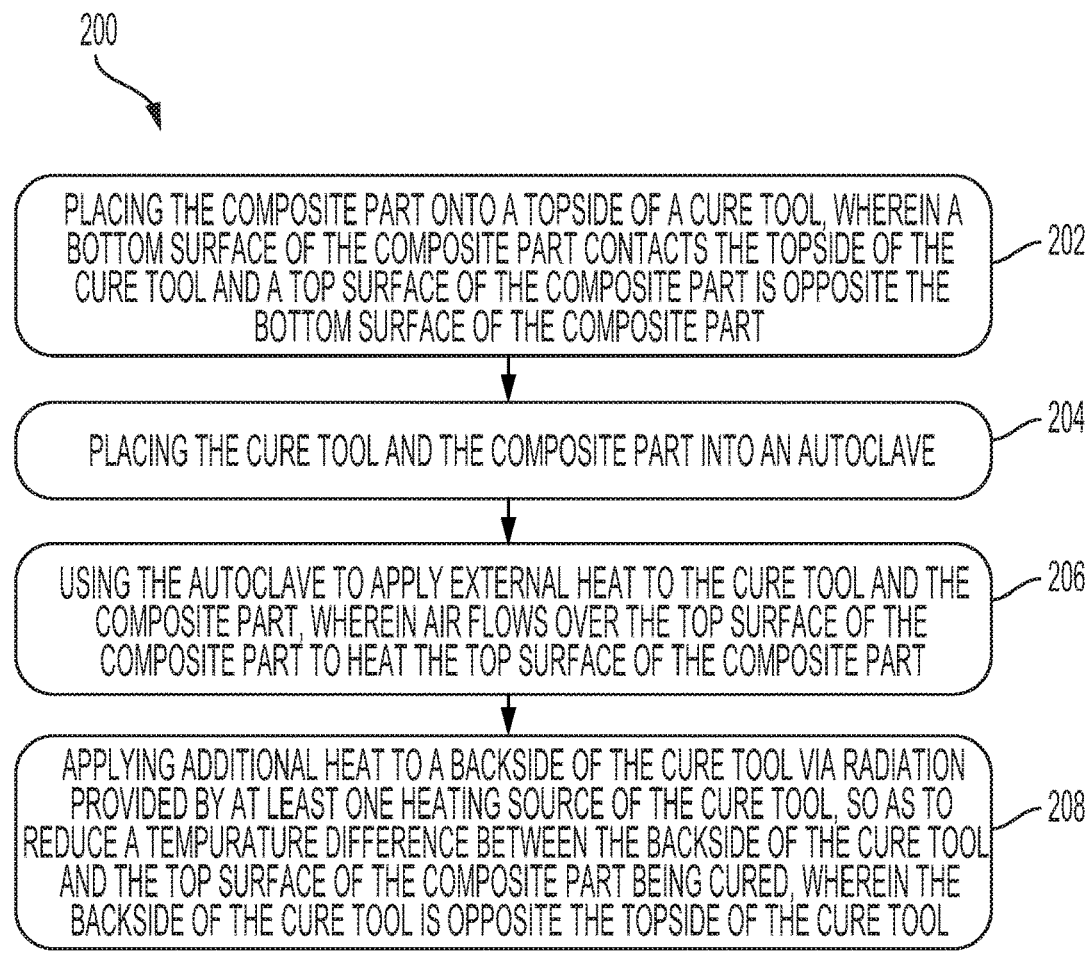
FIG. 5 shows a flowchart of an example of a method for curing the composite part 102, according to an example embodiment.

FIG. 5 shows a flowchart of an example of a method 200 for curing the composite part 102, according to an example embodiment. Method 200 shown in FIG. 5 presents an embodiment of a method that, for example, could be used with the cure tool 100 shown in FIG. 1, for example. In some examples, components of the cure tool 100 may be arranged to be adapted to, capable of, or suited for performing the functions, such as when operated in a specific manner. Method 200 may include one or more operations, functions, or actions as illustrated by one or more of blocks 202-208. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

It should be understood that for this and other processes and methods disclosed herein, flowcharts show functionality and operation of one possible implementation of present embodiments. Alternative implementations are included within the scope of the example embodiments of the present disclosure in which functions may be executed out of order from that shown or discussed, including substantially concurrent or in reverse order, depending on the functionality involved, as would be understood by those reasonably skilled in the art.

At block 202, the method 200 includes placing the composite part 102 onto the topside 104 of the cure tool 100, wherein the bottom surface 106 of the composite part 102 contacts the topside 104 of the cure tool 100 and the top surface 108 of the composite part 102 is opposite the bottom surface 106 of the composite part 102. At block 204, the method 200 includes placing the cure tool 100 and the composite part 102 into the autoclave 152. At block 206, the method 200 includes using the autoclave 152 to apply external heat to the cure tool 100 and the composite part 102, wherein air flows over the topside 104 of the composite part 102 to heat the topside 104 of the composite part 102. At block 208 the method 200 includes applying additional heat to the backside 110 of the cure tool 100 via radiation provided by at least one heating source (122-130) of the cure tool 100, so as to reduce a temperature difference (or variation) between the backside 110 of the cure tool 100 and the top surface 108 of the composite part 102 being cured, wherein the backside 110 of the cure tool 100 is opposite the topside 104 of the cure tool 100.

Within examples, the at least one heating source comprises the plurality of radiative heating sources 122-130 positioned in each of the closeable cell cavities 112-120, and applying additional heat to the backside 110 of the cure tool 100 via radiation comprises applying the additional heat using the plurality of radiative heating sources 122-130.

Within examples, the plurality of radiative heating sources 122-130 are independently controllable, and applying the additional heat using the plurality of radiative heating sources 122-130 comprises selecting one or more of the plurality of radiative heating sources 122-130 based on a location of the plurality of radiative heating sources 122-130 on the backside 110 of the cure tool 100, and applying the additional heat using the one or more of the plurality of radiative heating sources 122-130 for zoned control heating.

Within examples, applying additional heat to the backside 110 of the cure tool 100 comprises preventing transfer of heat to the topside of the cure tool by conduction or convection via vacuum and insulation of the closeable cell cavities 112-120 on the backside 110 of the cure tool 100.

Figure 6:
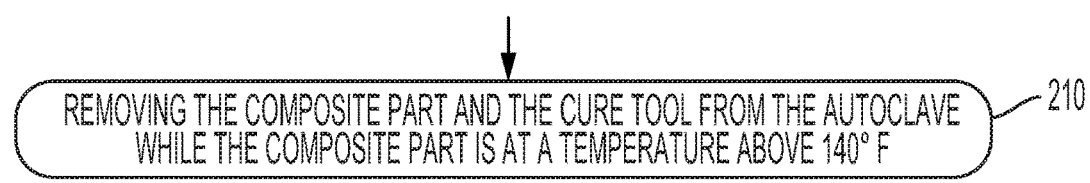
FIG. 6 shows another method for use with the method shown in FIG. 5, according to an example implementation.

FIG. 6 shows another method for use with the method 200 shown in FIG. 5, according to an example implementation. In FIG. 6, at block 210, the method includes removing the composite part 102 and the cure tool 100 from the autoclave 152 while the composite part 102 is at a temperature above 140° F.

Figure 7:
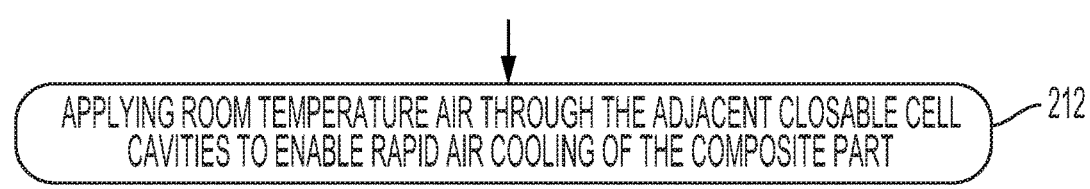
FIG. 7 shows another method for use with the method shown in FIG. 5, according to an example implementation.

FIG. 7 shows another method for use with the method 200 shown in FIG. 5, according to an example implementation. In FIG. 7, at block 212, in embodiments wherein the cure tool includes adjacent closable cell cavities on the backside of the cure tool, and in other embodiments, the method includes applying room temperature air through the adjacent closeable cell cavities 112-120 to enable rapid air cooling of the composite part 102.

FIG. 8 shows another method for use with the method 200 shown in FIG. 5, according to an example implementation. In FIG. 8, at block 214, in embodiments wherein the cure tool includes adjacent closable cell cavities on the backside of the cure tool, and in other embodiments, the method includes applying water through the adjacent closeable cell cavities 112-120 to enable rapid cooling of the composite part 102.

FIG. 9 shows another method for use with the method 200 shown in FIGS. 5 and 8, according to an example implementation. In FIG. 9, at block 216, in embodiments wherein the cure tool includes adjacent closable cell cavities on the backside of the cure tool, and in other embodiments, the method includes applying air through the adjacent closeable cell cavities 112-120 to remove the water from the adjacent closeable cell cavities 112-120.

FIG. 10 shows another method for use with the method 200 shown in FIG. 5, according to an example implementation. In FIG. 10, at block 218, in embodiments wherein the cure tool includes adjacent closable cell cavities on the backside of the cure tool, and in other embodiments, the method includes maintaining the closeable cell cavities 112-120 under vacuum pressure via the vacuum manifold 170 during portions of curing of the composite part 102.

Within examples, the cure tool 100 and the system 150 can be used during manufacture of composite parts, or during repair of composite parts. Examples of the disclosure may find use in a variety of potential applications, particularly in the transportation industry, including for example, aerospace, marine, automotive applications and other application where autoclave curing of composite parts may be used. As one example, examples of the disclosure may be used in the context of an aircraft manufacturing and service. Aircraft applications of the disclosed embodiments may include, for example, without limitation, curing of stiffener members such as, without limitation beams, spars and stringers, to name only a few.

Each of the methods described herein may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As used herein, by the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide. Similarly, the term "about" includes aspects of the recited characteristic, parameter, or value allowing for deviations or variations, including for example, tolerances, measurement error, measurement accuracy limitations and other factors known to skill in the art, and also ranges of the parameters extending a reasonable amount to provide for such variations.

The description of the different advantageous arrangements has been presented for purposes of illustration and description, and is not intended to be exhaustive or limited to the embodiments in the form disclosed. Many modifications and variations will be apparent to those of ordinary skill in the art. Further, different advantageous embodiments may describe different advantages as compared to other advantageous embodiments. The embodiment or embodiments selected are chosen and described in order to explain the principles of the embodiments, the practical application, and to enable others of ordinary skill in the art to understand the disclosure for various embodiments with various modifications as are suited to the particular use contemplated.

What is claimed is:

1. A method for curing a composite part, comprising:
    placing the composite part onto a topside of a cure tool, wherein a bottom surface of the composite part contacts the topside of the cure tool and a top surface of the composite part is opposite the bottom surface of the composite part;
    placing the cure tool and the composite part into an autoclave;
    using the autoclave to apply external heat to the cure tool and the composite part, wherein air flows over the top surface of the composite part to heat the top surface of the composite part; and
    applying additional heat to a backside of the cure tool via radiation provided by at least one heating source of the cure tool, so as to reduce a temperature difference between the backside of the cure tool and the top surface of the composite part being cured, wherein the backside of the cure tool is opposite the topside of the cure tool,
    wherein the cure tool includes adjacent closed cell cavities on the backside of the cure tool, and wherein the at least one heating source comprises a plurality of radiative heating sources positioned in each of the closed cell cavities, and wherein applying additional heat to the backside of the cure tool via radiation comprises applying the additional heat using the plurality of radiative heating sources.

2. The method of claim 1, wherein the plurality of radiative heating sources are independently controllable, and wherein applying the additional heat using the plurality of radiative heating sources comprises:
    selecting one or more of the plurality of radiative heating sources based on a location of the plurality of radiative heating sources on the backside of the cure tool; and
    applying the additional heat using the one or more of the plurality of radiative heating sources for zoned control heating.

3. The method of claim 1, wherein applying additional heat to the backside of the cure tool comprises:
    preventing transfer of heat to the topside of the cure tool by conduction or convection via vacuum and insulation of the adjacent closed cell cavities on the backside of the cure tool.

4. The method of claim 1, further comprising:
    removing the composite part and the cure tool from the autoclave while the composite part is at a temperature above 140° F.

5. The method of claim 1, further comprises:
    applying room temperature air through ports of the adjacent closed cell cavities to enable rapid air cooling of the composite part.

6. The method of claim 1, further comprising:
    applying water through ports of the adjacent closed cell cavities to enable rapid cooling of the composite part.

7. The method of claim 6, further comprising:
    applying air through ports of the adjacent closed cell cavities to remove the water from the adjacent closed cell cavities.

8. The method of claim 1, further comprising:
    maintaining the adjacent closed cell cavities under vacuum pressure via a vacuum manifold during portions of curing of the composite part.

9. A method for curing a composite part, comprising:
    placing the composite part onto a topside of a cure tool, wherein a bottom surface of the composite part contacts the topside of the cure tool and a top surface of the composite part is opposite the bottom surface of the composite part;
    placing the cure tool and the composite part into an autoclave;
    using the autoclave to apply external heat to the cure tool and the composite part, wherein air flows over the top surface of the composite part to heat the top surface of the composite part; and
    applying additional heat to a backside of the cure tool via radiation provided by at least one heating source of the cure tool, so as to reduce a temperature difference between the backside of the cure tool and the top surface of the composite part being cured, wherein the backside of the cure tool is opposite the topside of the cure tool,
    wherein applying additional heat to the backside of the cure tool comprises preventing transfer of heat to the topside of the cure tool by conduction or convection via vacuum and insulation of adjacent closed cell cavities on the backside of the cure tool.

10. The method of claim 9, wherein the at least one heating source is independently controllable, and wherein applying the additional heat using the at least one heating source comprises:
    selecting one or more of the at least one heating source based on a location of the at least one heating source on the backside of the cure tool; and
    applying the additional heat using the one or more of the at least one heating source for zoned control heating.

11. The method of claim 9, further comprising:
    removing the composite part and the cure tool from the autoclave while the composite part is at a temperature above 140° F.

12. The method of claim 9, further comprising:
    applying room temperature air through ports of the adjacent closed cell cavities to enable rapid air cooling of the composite part.

13. The method of claim 9, further comprising:
    applying water through ports of the adjacent closed cell cavities to enable rapid cooling of the composite part.

14. The method of claim 13, further comprising:
    applying air through the ports of the adjacent closed cell cavities to remove the water from the adjacent closed cell cavities.

15. A method for curing a composite part, comprising:
    placing the composite part onto a topside of a cure tool, wherein a bottom surface of the composite part contacts the topside of the cure tool and a top surface of the composite part is opposite the bottom surface of the composite part;
    placing the cure tool and the composite part into an autoclave;
    using the autoclave to apply external heat to the cure tool and the composite part, wherein air flows over the top surface of the composite part to heat the top surface of the composite part;
    applying additional heat to a backside of the cure tool via radiation provided by at least one heating source of the cure tool, so as to reduce a temperature difference between the backside of the cure tool and the top surface of the composite part being cured, wherein the backside of the cure tool is opposite the topside of the cure tool; and maintaining adjacent closed cell cavities positioned on the backside of the cure tool under vacuum pressure via a vacuum manifold during portions of curing of the composite part.

16. The method of claim 15, wherein the at least one heating source is independently controllable, and wherein applying the additional heat using the at least one heating source comprises:
- selecting one or more of the at least one heating source based on a location of the at least one heating source on the backside of the cure tool; and
- applying the additional heat using the one or more of the at least one heating source for zoned control heating.

17. The method of claim 15, further comprising:
- removing the composite part and the cure tool from the autoclave while the composite part is at a temperature above 140° F.

18. The method of claim 15, further comprising:
- applying room temperature air through ports of the adjacent closed cell cavities to enable rapid air cooling of the composite part.

19. The method of claim 15, further comprising:
- applying water through ports of the adjacent closed cell cavities to enable rapid cooling of the composite part.

20. The method of claim 19, further comprising:
- applying air through the ports of the adjacent closed cell cavities to remove the water from the adjacent closed cell cavities.

* * * * *